(No Model.)
C. M. SCHAFFER.
VELOCIPEDE.
No. 297,300. Patented Apr. 22, 1884.
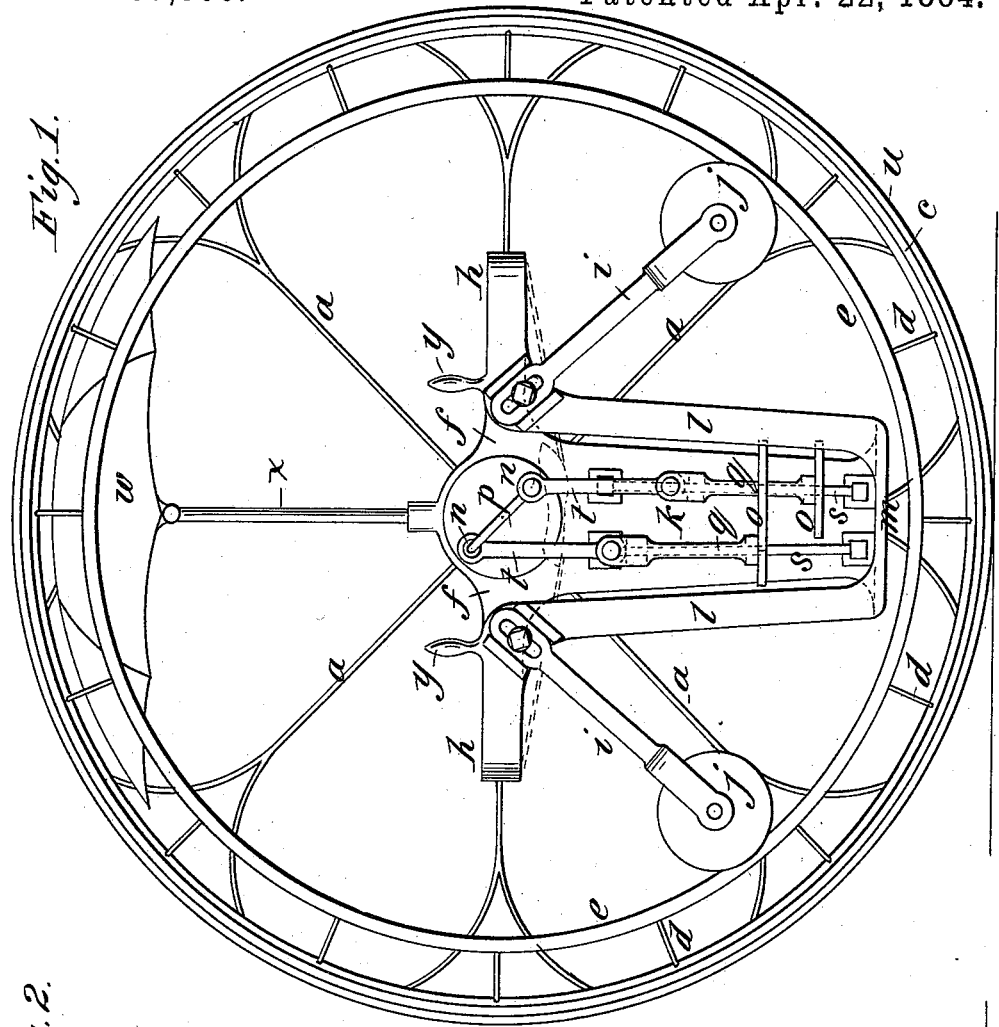
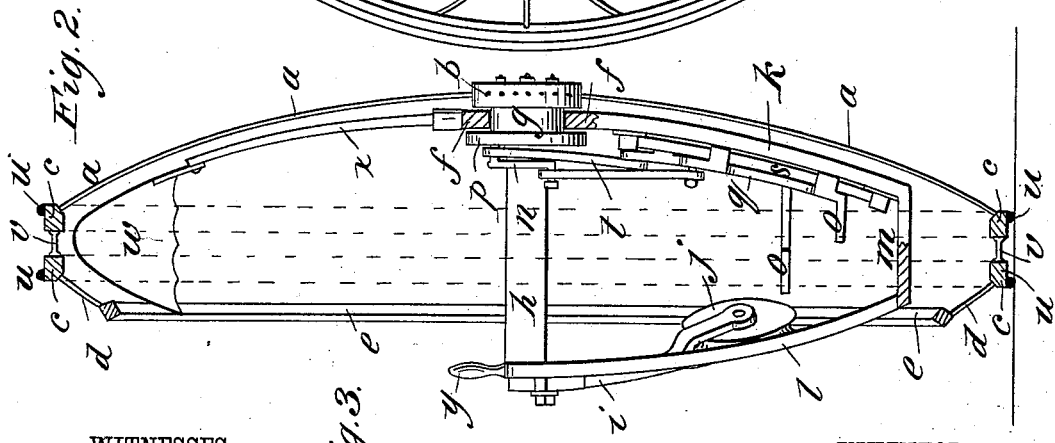
WITNESSES:  INVENTOR:
Donn Twitchell  C. M. Schaffer
C. Sedgwick  BY Munn & Co
ATTORNEYS.

United States Patent Office.

CHARLES M. SCHAFFER, OF LOUISVILLE, KY., ASSIGNOR TO HIMSELF, JAMES T. RITCHEIG, C. C. ALLEN, AND G. W. ALLEN, ALL OF SAME PLACE.

VELOCIPEDE.

SPECIFICATION forming part of Letters Patent No. 297,300, dated April 22, 1884.

Application filed October 8, 1883. (No model.)

*To all whom it may concern:*

Be it known that I, CHARLES M. SCHAFFER, of Louisville, in the county of Jefferson and State of Kentucky, have invented a new and Improved Unicycle Velocipede, of which the following is a full, clear, and exact description.

My invention consists of a contrivance for the construction of the wheel and frame of a unicycle velocipede with one open side, substantially as hereinafter described and claimed, to facilitate ingress and egress, to obtain better views of surroundings, to permit conversation being carried on easily by persons riding side by side, to lessen weight, to enhance the appearance of the machine, and to facilitate mounting and starting.

Reference is to be had to the accompanying drawings, forming part of this specification, in which similar letters of reference indicate corresponding parts in all the figures.

Figure 1 is a side elevation of my improved velocipede. Fig. 2 is a sectional elevation. Fig. 3 is a section showing a modified form of the rim or felly that I prefer to use when the machine is to be used for high speed; and Fig. 4 is a side view of a stud-bolt employed for connecting the two rims of a wide felly, which is preferred to render the machine more easy of management than with a narrow rim, and to afford an outlook ahead.

One side of the wheel has spokes $a$ connecting the hub $b$ and the felly-rim $c$ in the usual way; but the other side consists of short spokes $d$ and the rim $e$, said rim being nearly as large as the felly, and being connected to it by said short spokes. The supporting-frame for the operator consists of the bar $f$ bearing in the groove $g$ of the hub, with U-shaped arms $h$, which are supported on the open side of the wheels by arms $i$, each having a grooved roller, $j$, running on the rim $e$, said arms $i$ being adjustably connected to frame-arms $h$ to level the frame. This frame has hangers $k$ and $l$, suspending the platform or foot-board $m$ the proper distance from the hub and above the rim of the wheel, for the purposes of the operator, and a seat will be arranged on said hangers or frame, as may be preferred. One roller may be used instead of two for the support of the frame on the open side of the machine; but in that case the arm of the roller will be connected to the hangers $l$ or to a bracket of the platform $m$ directly under the center of the wheel. The U-shaped arm portions $h$ of the frame-bar $f$ terminate sufficiently short of the center of the wheel to afford space for the entry of the operator into the supporting-frame through the open side of the machine.

A double driving-crank, $n$, is used in this case for connecting the treadles $o$ to the wheel, said crank being connected to the disk $p$ of the inside of the hub. The treadle-rods $q$ are arranged before and behind the center of the wheels, respectively, on the guides $s$, and one of said treadles is made longer than the other to reach back even with it for uniform action of both feet of the operator. The rods $q$, to which the treadles are attached, are connected with the cranks by suitable connecting-rods, $t$.

I propose to make the felly to consist of two rims, $c$, which I will place close together, as in Fig. 3, for machines to be used by expert operators, and will provide each rim with a rubber tire, U; but for other machines requiring a wider rim, I propose to locate the rims $c$ wider apart and connect them by short bolts $v$, which besides making the machine more manageable by inexperienced persons, affords an outlook straight ahead for the operator.

In this improved wheel the canopy $w$ is supported by a single stanchion, $x$, rising up from the frame-piece $f$, instead of two, as in other wheels. The hand-holes $y$, for the operator to stay himself by, are attached to frame-arms $h$.

Having thus fully described my invention, I claim as new and desire to secure by Letters Patent—

1. A unicycle velocipede having a wheel, one side of which consists of a rim, $e$, of nearly the size of the felly-rim, and short spokes $d$, connecting said rim $e$ with the felly-rim, substantially as described.

2. A unicycle velocipede having a wheel, one side of which consists of a rim, $e$, of nearly the size of the felly-rim, and spokes $d$, connecting said rim $e$ with the felly-rim, and also having a frame for the operator, one side of which is supported on the wheel-hub, and the other side is supported on the rim $e$ by one or more grooved rollers, $j$, substantially as described.

3. In a unicycle velocipede, the combination, with the frame-bar $f$, supported on the hub of the wheel, and having U-shaped arms $h$, of the arms $i$, having the grooved rollers $j$ traveling on the rim $e$ of the wheel, substantially as and for the purpose set forth.

4. In a unicycle velocipede, the combination, with the frame-bar $f$, supported on the hub of the wheel, and having U-shaped arms $h$, of the arms $i$, having the grooved rollers $j$ traveling on the rim $e$ of the wheel, and adjustably connected to the said arms, substantially as and for the purpose set forth.

5. The combination, with a unicycle velocipede having an open-sided wheel of the frame-bar $f$, supported on the hub of the wheel, and having U-shaped arms $h$, supported by one or more rollers, $j$, on the rim $e$ of the open side of the wheel, substantially as described.

6. The rim of a unicycle-wheel, consisting of two felly-rims, $c$, connected by short bolts $v$, with a clear space between said felly-rim, forming an outlook directly ahead of the operator, substantially as described.

7. A unicycle velocipede having a wheel open at one side, and having a car or frame for the operator, sustained internally of the wheel from the hub and by adjustable rollers, substantially as described.

CHARLES M. SCHAFFER.

Witnesses:
T. N. EASTIN,
H. W. HAWES.